United States Patent [19]
Kohno et al.

[11] Patent Number: 5,819,300
[45] Date of Patent: Oct. 6, 1998

[54] DOCUMENT PROCESSING APPARATUS AND METHOD THEREFOR

[75] Inventors: Akihiro Kohno; Tadashi Yamakawa, both of Yokohama, Japan

[73] Assignee: Canon Kabushiki Kaisha, Tokyo, Japan

[21] Appl. No.: 963,907

[22] Filed: Nov. 4, 1997

Related U.S. Application Data

[63] Continuation of Ser. No. 364,291, Dec. 27, 1994, abandoned.

[30] Foreign Application Priority Data

Dec. 28, 1993 [JP] Japan .................................. 5-334365

[51] Int. Cl.⁶ ............................................ G06F 17/21
[52] U.S. Cl. ...................... 707/511; 707/513; 707/530
[58] Field of Search ................................ 707/511, 513, 707/530, 500, 501, 515, 531; 345/329–332

[56] References Cited

U.S. PATENT DOCUMENTS

| | | | |
|---|---|---|---|
| Re. 34,835 | 1/1995 | Ozeki ................................... | 345/153 |
| 5,021,972 | 6/1991 | Nishi ................................... | 395/173 X |
| 5,040,142 | 8/1991 | Mori et al. ......................... | 707/511 X |
| 5,150,458 | 9/1992 | Masuzaki et al. .................. | 707/511 X |
| 5,220,657 | 6/1993 | Bly et al. ............................ | 345/329 X |
| 5,261,040 | 11/1993 | Suzuki ................................. | 345/146 |
| 5,278,979 | 1/1994 | Foster et al. ........................ | 707/511 X |
| 5,438,661 | 8/1995 | Ogawa ................................. | 707/511 X |
| 5,561,811 | 10/1996 | Bier ..................................... | 395/825 |

FOREIGN PATENT DOCUMENTS

| | | |
|---|---|---|
| 0413653 | 2/1991 | European Pat. Off. . |
| 0551696 | 7/1993 | European Pat. Off. . |

OTHER PUBLICATIONS

"The Art of Navigating Through Hypertext", J. Nielsen, Communications of the ACM, Mar. 1990, USA, vol. 30, No. 3, ISSN 0001–0782, pp. 296–310.

"Document Formatting for Interchange Between Word Processors", A.L. Amanda, Computer Communications, Ded. 1988, UK, vol. 11, No. 6, ISSN 0140–3664, pp. 319–324.

*Primary Examiner*—Joseph H. Feild
*Attorney, Agent, or Firm*—Fitzpatrick, Cella, Harper & Scinto

[57] ABSTRACT

A document processing apparatus capable of clearly indicating, to each user, the information changed since the last reference by the user, by storing the last referred document information for each user.

At the end of each system function, the referred structured document is registered as past document information for each user in an auxiliary memory device, and, when the user refers again to this document information, the document information at the last reference is compared with the current document information in order to clarify the changes.

33 Claims, 25 Drawing Sheets

\<Title\> ABC Song \</Title\>

\<Paragraph ID=1\> A B C D

\<List\> \<Item\>

\<ItemHead\> E F G \</ItemHead\>

\<ItemParagraph\> H I J K L M N

\<ItemParagraph\>

\</Item\>

\</List\>

O P Q R \<Emphasize\> S T \</Emphasize\>

\</Paragraph\>

DEF

HIJKL

XYZabcdefghi jklmnopqrstu

...

[PAST DOCUMENT]

ABC

HIJKL

MNOPQRSTUVW

XYZabcdefghi jklmnop qrstu

...

[CURRENT DOCUMENT]

FIG. 12

```
*** PAST DOCUMENT
--- CURRENT DOCUMENT
***************
*** 1, 3 ****
! D E F
  H I J K L
  X Y Z a b c d e f g h i
--- 1, 4 ----
! A B C
  H I J K L
  M N O P Q R S T U V W
  X Y Z a b c d e f g h i
***************
*** 4, 6 ****
! j k l m n o p q r s t u
--- 5, 8 ----
! j k l m n o p
! q r s t u
***************
...
```

FIG. 13

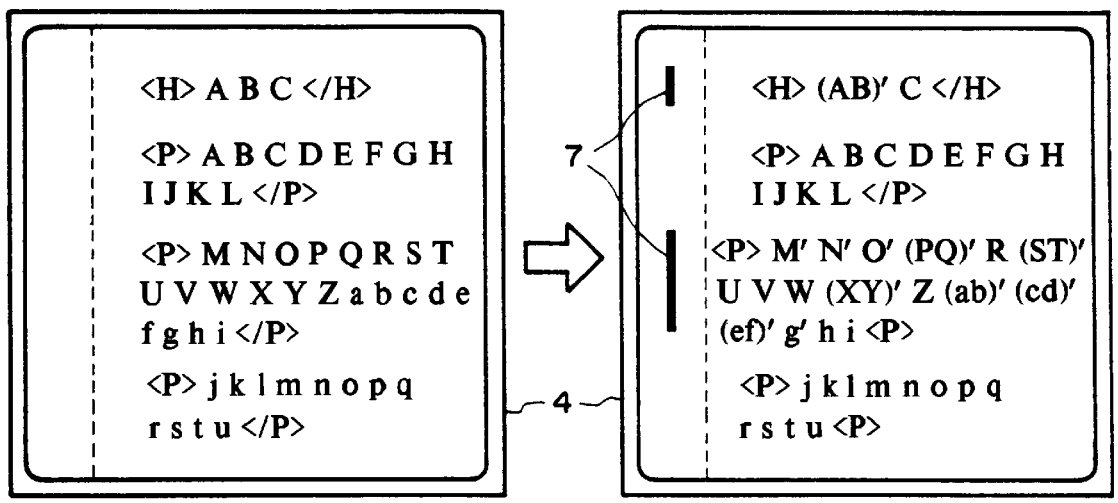
F I G. 14
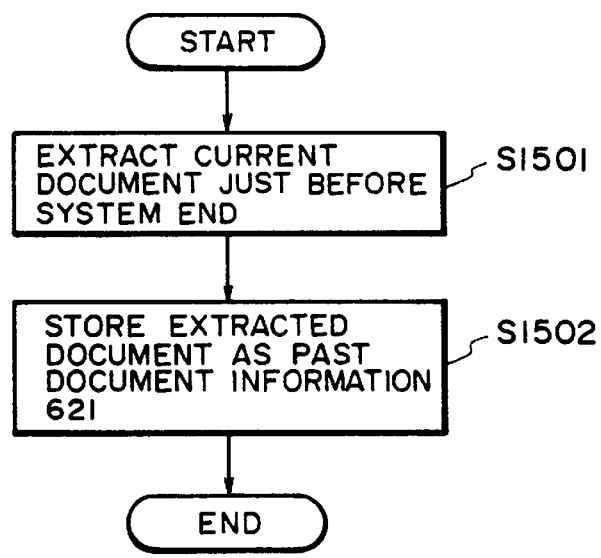
F I G. 15

<Document MAX=5>

<Title Counter=2> ABC Song </Title>

<Paragraph Counter=3> A B C D

<List Counter=5> <Item Counter=5>

<ItemHead Counter=4> E F G </ItemHead>

<ItemParagraph Counter=5> H I J K L M N

</ItemParagraph>

</Item>

</List>

O P Q R <Emphasize Counter=1> S T </Emphasize>

</Paragraph>

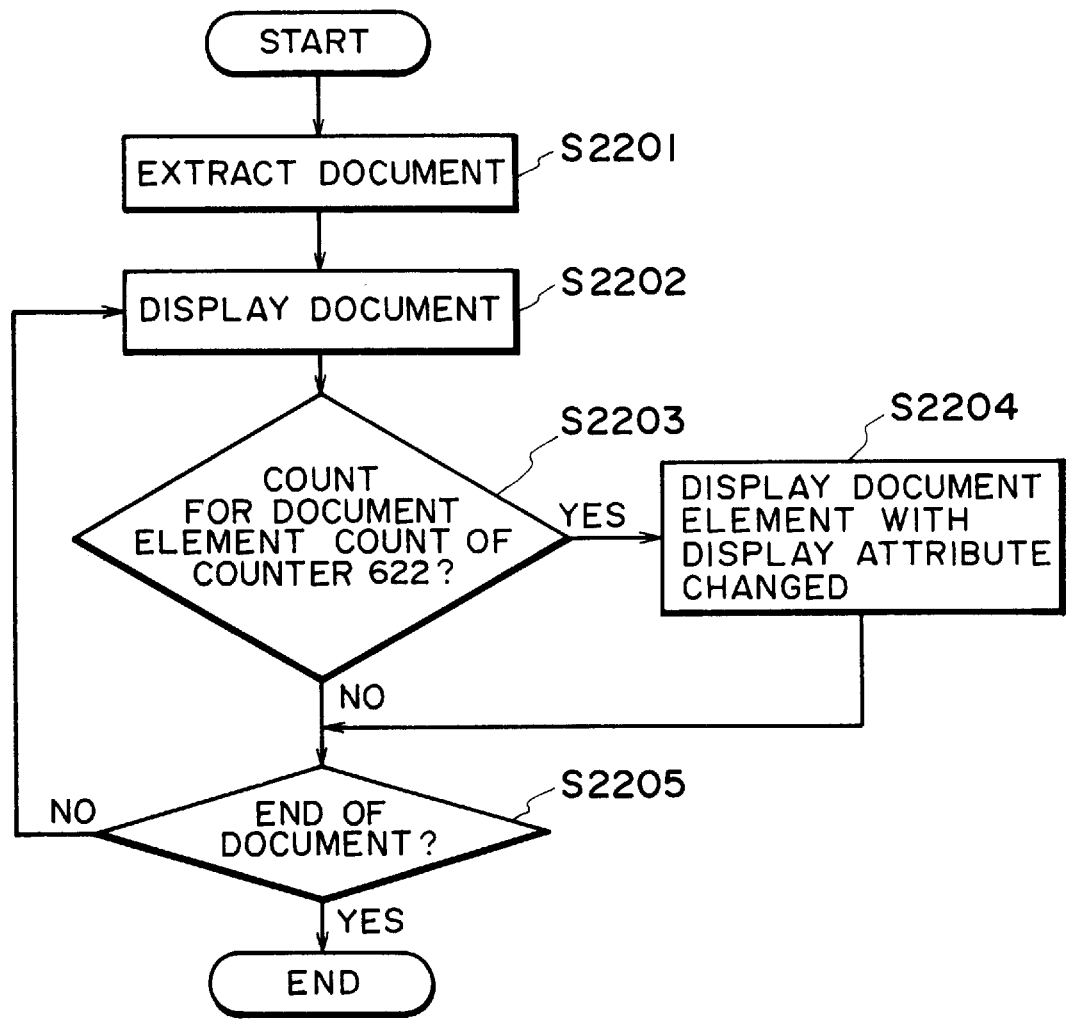
F I G. 22

\<Document\>

\<Title date= "93. 10. 25" Time= "17:25"\>

ABC Song

\<Title\>

\<Paragraph date= "93.10 24" time= "09:25"\>

A B C D

\<List date= "93. 10. 25" time= "17:15"\>

\<Item date= "93. 10. 25" time= "17:15"\>

\<ItemHead date= "93. 10. 25" time= "12:13"\>

E F G

\</ItemHead\>

\</ItemParagraph date= "93. 10. 25" time= "17:15"\>

H I J K L M N

\</ItemParagraph\>

\<Item\>

\</List\>

O P Q R

\<Emphasize date= "93. 10. 2" time= "11:52" \> S T \</Emphasize\>

\</Paragraph\>

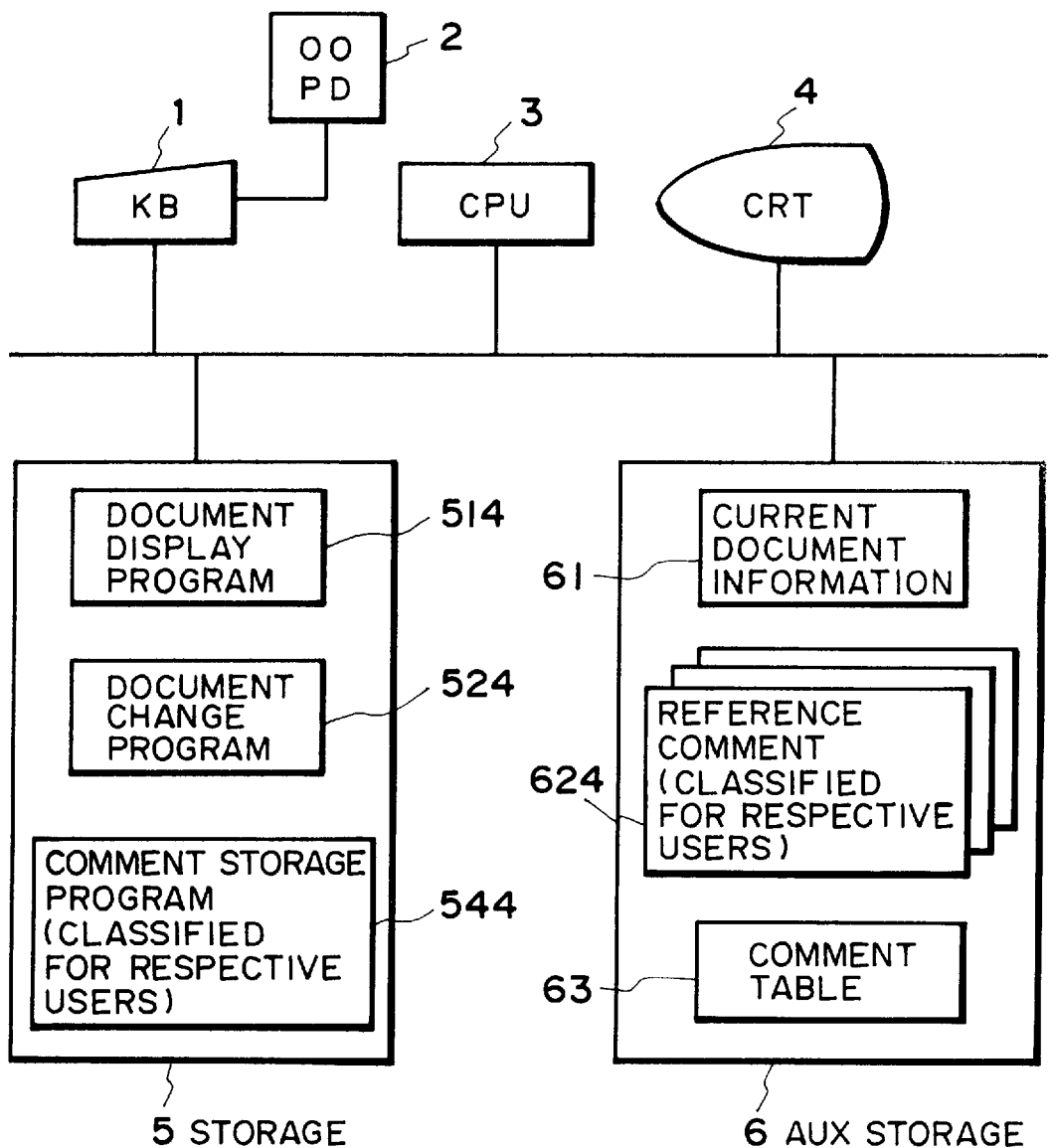
F I G. 28

\<Document\>

\<Title Comment= "Comment 2" \>

ABC Song

\</Title\>

\<Paragraph Comment= "Comment 3" \>

A B C D

\<List Comment= "Comment 5" \>

\<Item Comment= "Comment 5" \>

\<ItemHead Comment= "Comment 4" \>

E F G

\</ItemHead\>

\</ItemParagraph Comment= "Comment 5" \>

H I J K L M N

\</ItemParagraph\>

\<Item\>

\</List\>

O P Q R

\<Emphasize Comment= "Comment 1" \> S T \</Emphasize\>

\</Paragraph\>

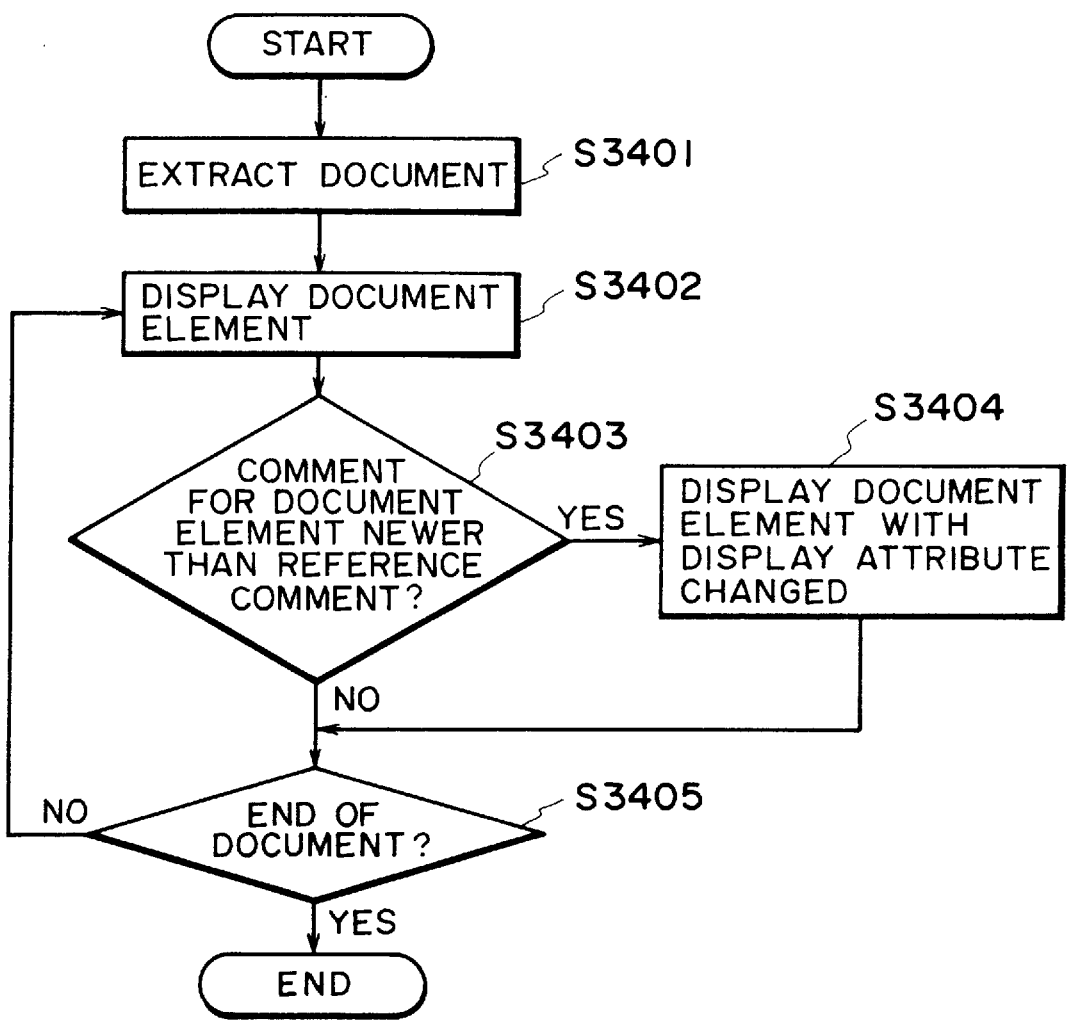
F I G. 34

DOCUMENT PROCESSING APPARATUS AND METHOD THEREFOR

This application is a continuation of application Ser. No. 08/364,291 filed Dec. 27, 1994, which is now abandoned.

BACKGROUND OF THE INVENTION

1. Field of the Invention

The present invention relates to a document processing apparatus for electronically processing a document, and also to a method therefor.

2. Related Background Art

Document information means a group of data that can be represented as a document, and can be described as a document of the structure as defined in SGML (ISO 8879). The data of such structured document can be stored by the unit of said structure, utilizing for example the directory structure of an already existing file (FIG. 3).

Such stored structured data group is information recognizable for human being as a document. For such recognition, there is utilized means such as "display", "printing" or "listening".

Also data of other document information may be used in common, utilizing for example conventional link technology. Structured data collected as a group as shown in FIG. 4 provides the format of the document, and constitute a document information.

Such document information can be displayed as a document, for example by a conventional hypertext system (FIG. 5).

For handling information variable from the previously referred document information, there is already known a system of recording the information, in the unit of each document, at each timing of reference and comparing such information.

FIG. 6 shows the configuration of such system, wherein provided are a keyboard 1; a pointing device 2; a CPU 3; a CRT 4; a memory device 5 for storing programs and data; and an auxiliary memory device for permanently storing programs and data. The memory device 5 and the auxiliary memory device 6 need not necessarily be separated but may be united as a program/data storage device.

The memory device 5 stores a document display program 510, a document change program 520, a document comparison program 530 and a document storage program 540.

The auxiliary memory device 6 stores current document information 61 and past document information 620.

FIG. 7 is a flow chart showing the operation sequence of such conventional system.

When the system is activated, an event is awaited in an event loop S701.

In case a display operation is executed, the document is displayed on the CRT 4 (S702).

In case an editing operation is executed with the keyboard 1 or by the pointing device 2, the document is changed (S703).

In case of a comparison, the change between the current document and the past document is displayed on the CRT 4 (S704).

At the end of the function of the system, the current document is stored as a past document in the auxiliary memory device 6 (S705).

In the following there will be explained the details of each event.

At first there will be explained the operations of display, in S702 in FIG. 7, with reference to a flow chart shown in FIG. 8.

When the user effects an operation for document display, a step S801 extracts the current document information 61 from the auxiliary memory device 6.

Then a step S802 displays the document on the CRT 4, and the sequence returns to the event loop.

In the following explained are the operations of editing, in S703 in FIG. 7, with reference to a flow chart in FIG. 9.

When the user effects an operation for document editing, a step S901 extracts the current document information 61 from the auxiliary memory device 6.

In a next step S902, the document is edited by the document change program 520. This part corresponds to dialogue document data processing of so-called document editer.

After the editing, the document is stored in a step S903 as the current document information 61, and the sequence returns to the event loop.

In the following explained are the operations of comparison, in S704 in FIG. 7, with reference to a flow chart shown in FIG. 10.

When the user effects an operation for comparison of the current and past documents, a step S1001 extracts the current document information 61 from the auxiliary memory device 61.

Also a step S1002 extracts the past document information 620 from the auxiliary memory device 6.

In a next step S1003, information indicating the change in the document is displayed, for example by a program diff in the UNIX system.

In this case a display as shown in FIG. 13 is obtained by the comparison of the two extracted document information as shown in FIG. 12, and the sequence returns to the event loop.

Finally the ending sequence, in S705 in FIG. 7, will be explained with reference to a flow chart shown in FIG. 11.

When the user intends to terminate the operation of the system, a step S1101 extracts the current document information 61 from the auxiliary memory device 6.

The extracted document is stored, in a step S1102, as the past document information 620.

The flow charts in FIGS. 8, 9, 10 and 11 respectively represent the document display program 510, document change program 520, document comparison program 530 and document storage program 540.

In such system, the previously referred document information is always stored as the past document information 620, and the change in the information can be known by the comparison and display of the current and past document information.

However the storage of the entire document referred previously or of the documents of the entire previous version, always as the past document information 620, is inefficient in consideration of the memory capacity.

On the other hand, there is also known a system, such as SCCS or RCS in the UNIX system, of storing only the information indicating the change resulting from the editing of the document under utilization, wherein the previous information can be known from the comparison with the current document.

Such system, storing only the changed information, can resolve the above-mentioned difficulty relating to the memory capacity.

However, such systems effect the processing for the entire document and the comparison in the unit of a line, and is incapable of the processing in the unit of each structure in the structured document mentioned above.

For such structured document, there is also known a system designed to process the entire document but to effect the comparison for each structure and to store only the information of the changed structure.

Such system can display, in the unit of each structure, the information changed from the previously referred document or the documents of the previous version, by a change in the display feature, such as the display of a black line in the vicinity of the change, as shown in FIG. 14.

In FIG. 14, black lines 7 indicate the portions where the information is changed from the previously referred document or from the documents of the previous version.

Now let us consider a case in which the information is utilized by plural users.

The document information subjected to frequent renewals in the content is usually maintained and changed, in time, by a particular user or by plural users.

On the other hand, the users requiring reference to such document always want to see the latest version of the document information.

Consequently, such document information subjected to frequent content changes is commonly referred to by plural users.

However, in such case where the document information is commonly owned by plural users and is subjected to frequent content changes, the information may be changed while such change is not made known to the user who refers to said information.

For this reason, each user wishes to know the change by the comparison of the information referred previously and already known to said user and the latest information still unknown to said user.

Thus, even though the document information is commonly owned and utilized by plural users, the information actually desired by the user at the reference may be different from user to user.

Therefore, in the structured document such as mentioned above, in providing each user with the latest information, it often becomes unclear to the user which information within the document is already known to the user and which part is still unknown to him.

SUMMARY OF THE INVENTION

In consideration of the foregoing, an object of the present invention is to provide a document processing apparatus, and a document processing method therefor, capable of clearing indicating the position of the changed information, between the previously referred document and the current document, thereby enabling comprehension of the already known information and the unknown information.

Another object of the present invention is to provide a document processing apparatus and a document processing method therefor, capable of reducing the memory capacity in storing document, by storing very limited information such as a counter value and a time as the past information instead of the document itself, in contrast to the conventional method such as diff storing all the information for each user and thus requiring a large memory capacity.

Still another object of the present invention is to provide a document processing apparatus and a method therefor, capable of clearly indicating the change of the information, even when the comparison of the past document information and the current one is not particularly intended.

The above-mentioned objects can be attained, according to the present invention, by a document processing apparatus provided with document information utilizable by plural operators, comprising:

editing means for editing said document information; first memory means for storing the document information edited by said editing means; second memory means for storing, for each operation, the document information last referred to or edited by each operator; comparison means for comparing the document information stored in said first memory means and that stored in said second memory means; and display control means for causing a display in which the document information identified as changed by said comparison means is distinguishable.

Also according to the present invention, there is provided an information processing method comprising:

an editing step for editing document information; a first memory step for storing said edited document information; a second memory step for storing, for each operator, the document information last referred to or edited by said operator; a comparison step for comparing the document information stored in said first memory step and that stored in said second memory step; and display control step for causing a display in which the document information identified as changed by said comparison step is made distinguishable.

BRIEF DESCRIPTION OF THE DRAWINGS

FIG. 2 is a view showing an example of the structured document;

FIG. 12 is a view showing an example of past and current documents;

FIG. 13 is a view showing an example of display by the diff in the UNIX system;

FIG. 14 is a view showing an example of the display of the changed information;

FIG. 15 is a flow chart for the end of reference and document storage for each user;

FIG. 17 is a view showing an example of structured document bearing counters and maximum values thereof;

FIG. 22 is a flow chart for document information display;

FIG. 23 is a view showing an example of the structured document having renewal times;

FIG. 28 is a view showing the system configuration of a fourth embodiment;

FIG. 29 is a view showing an example of the structured document with comments;

FIG. 34 is a flow chart for display of changed information.

DETAILED DESCRIPTION OF THE PREFERRED EMBODIMENTS

[Embodiment 1]

Now the present invention will be clarified by an embodiment shown in the attached drawings.

Figure 1:
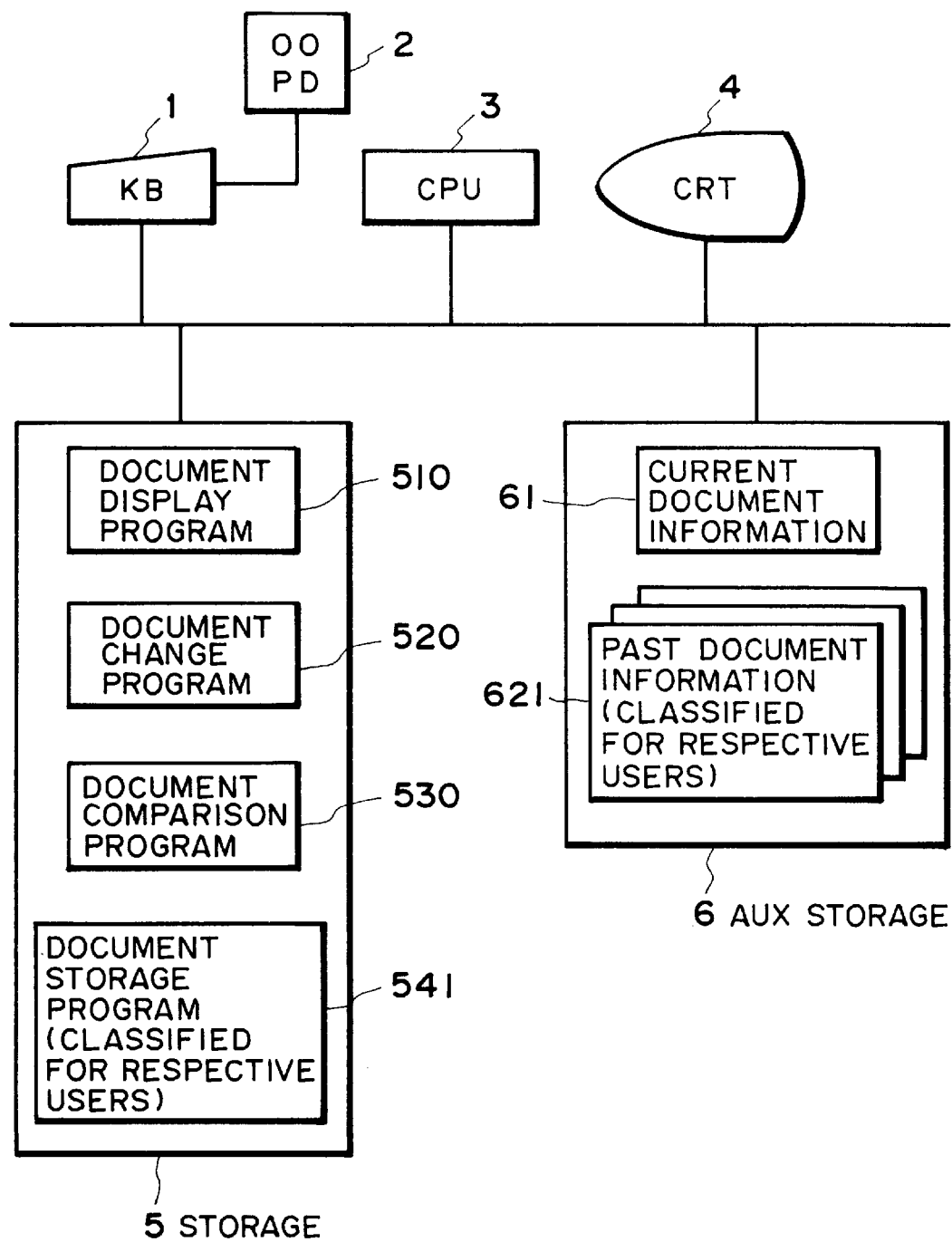
FIG. 1 is a view showing the system configuration of a first embodiment.
Figure 3:
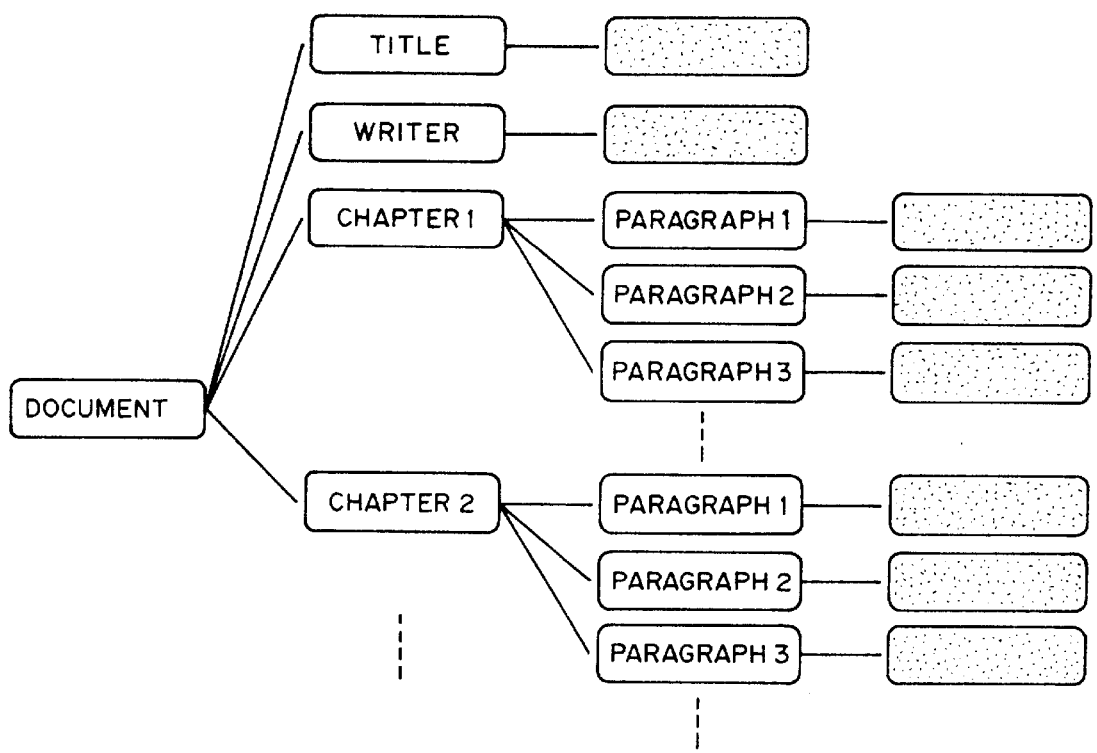
FIG. 3 is a view showing an example of data storage.
Figure 4:
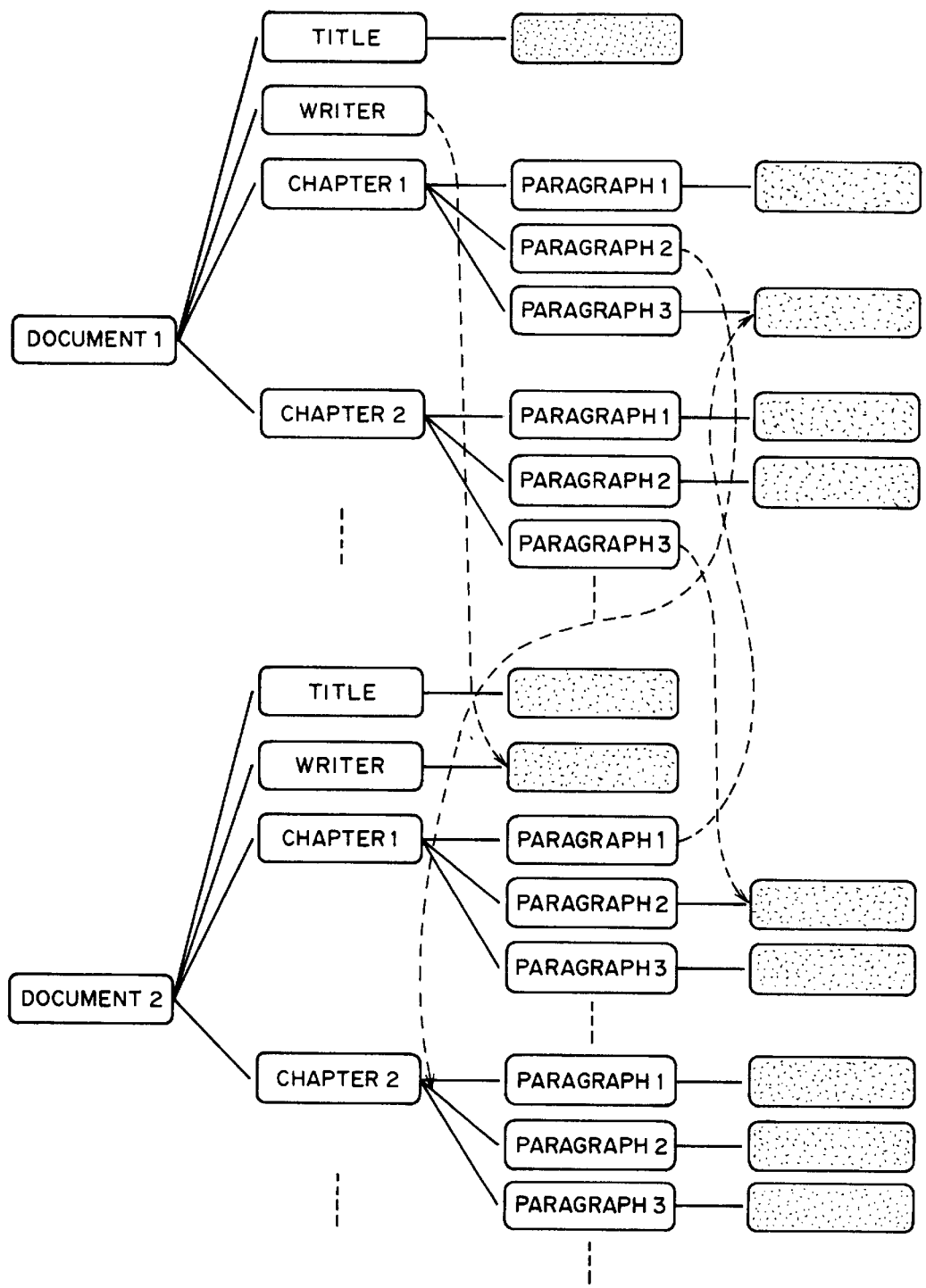
FIG. 4 is a view showing an example of providing documents from data.
Figure 5:
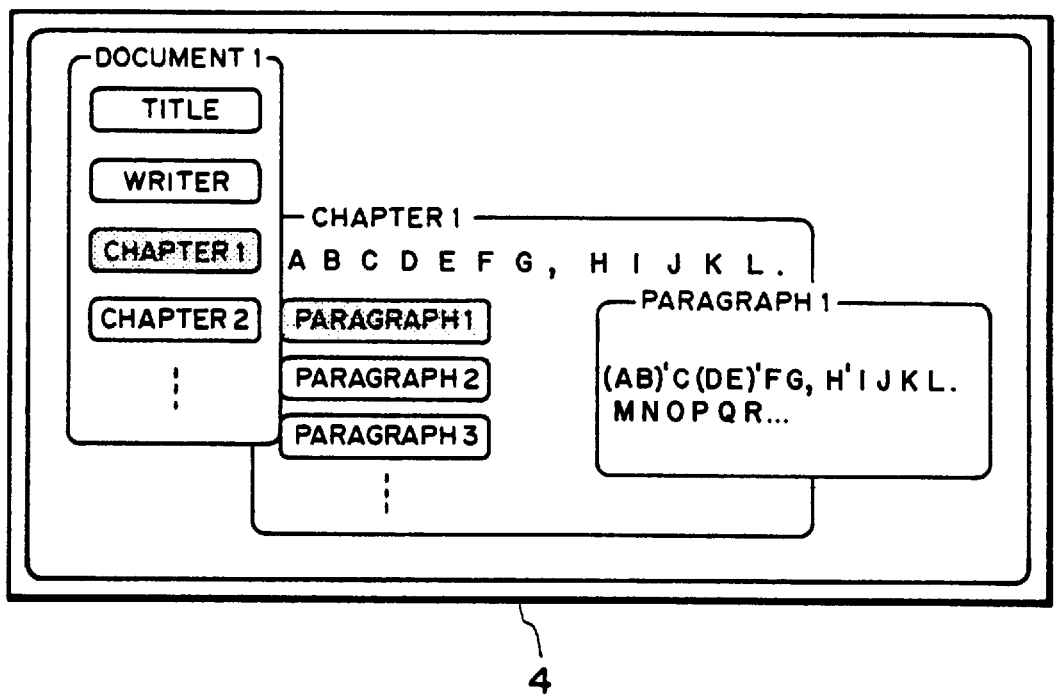
FIG. 5 is a view showing an example of document display.
Figure 6:
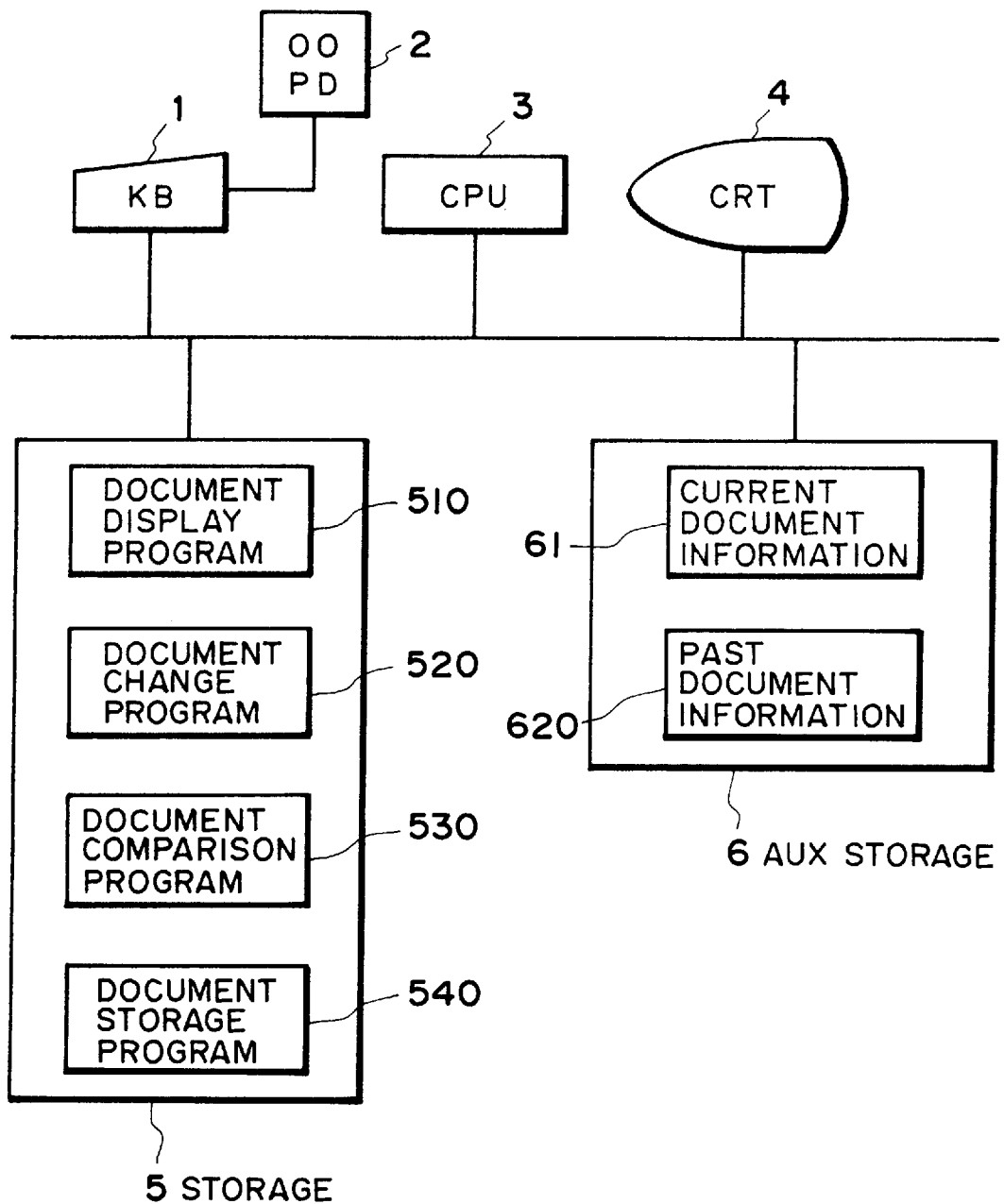
FIG. 6 is a view showing the configuration of a conventional system.

FIG. 1 is a block diagram showing the configuration of a document processing apparatus of the present invention.

As shown in FIG. 1, the document storage program 540 in the conventional system configuration is replaced, in the present embodiment, by a document storage program 541 classified for respective users.

Also in the auxiliary memory device 6, the past document information 620 in the conventional configuration is replaced by past document information 621 classified for respective users.

Said user-classified past document information 621 can be a group of the past document information 620 of the conventional example, by the number of the users.

In the present embodiment, whenever the function of the system is terminated, the referred structured document is registered for each user in the past document information 621 of the auxiliary memory device 6. Thus the document information at the last reference is retained, and, when the same user refers to the document information again, the changed point is clarified by the comparison with the current document, as will be explained in the following.

Figure 7:
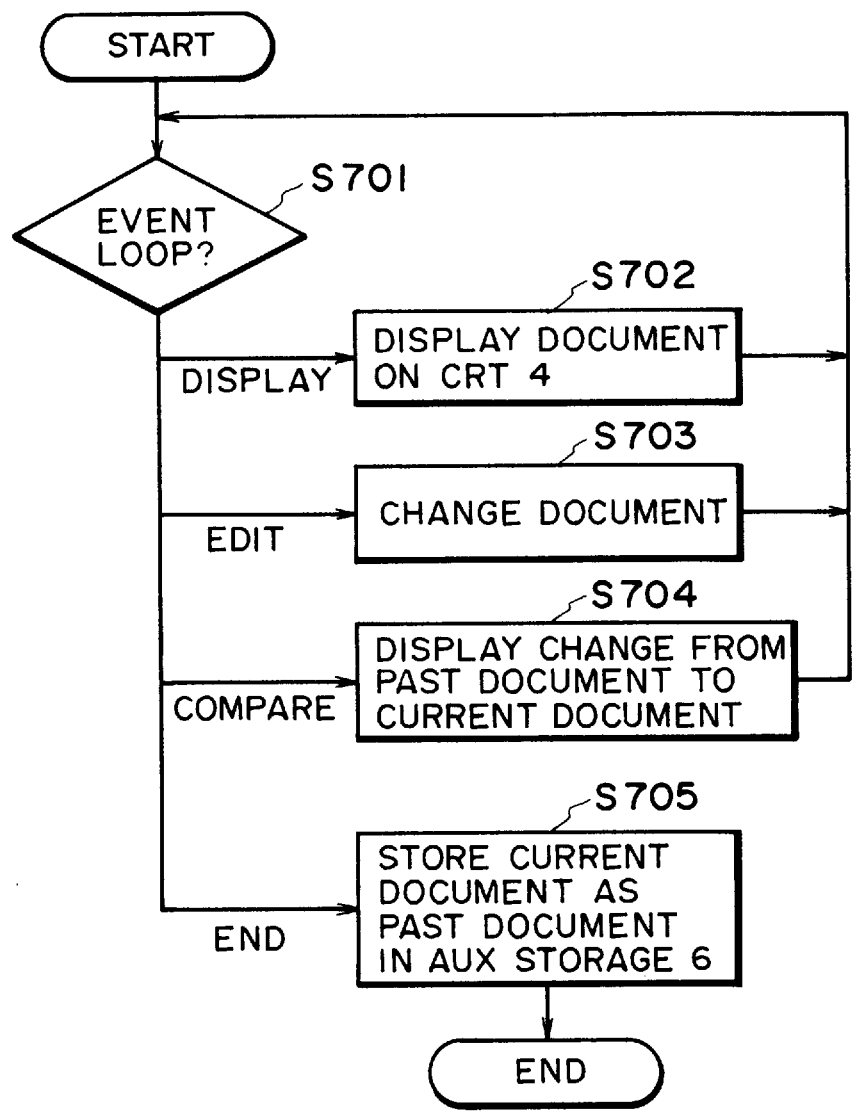
FIG. 7 is a system flow chart of a conventional example.

The system flow chart of the present embodiment (not shown) is same as the conventional flow chart (FIG. 7) except that the past document storage in S705 is replaced by the user-classified past document storage.

Figure 8:
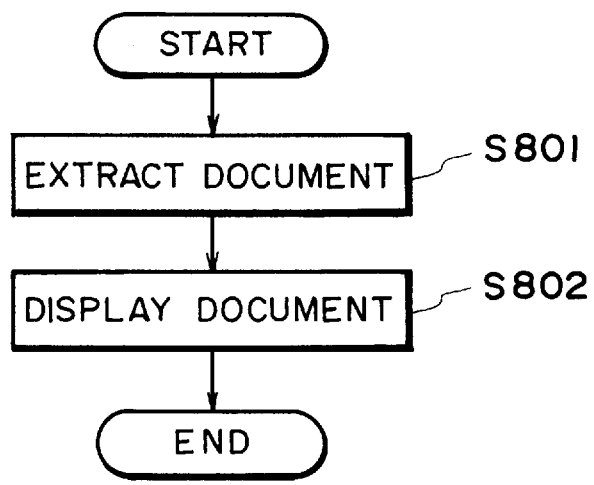
FIG. 8 is a flow chart for document extraction and display.

As already explained in the conventional example, when the user effects an operation to display the document information, the current document information 61 is extracted, according to the flow chart shown in FIG. 8, from the auxiliary memory device 6 and displayed on the document CRT 4.

Figure 9:
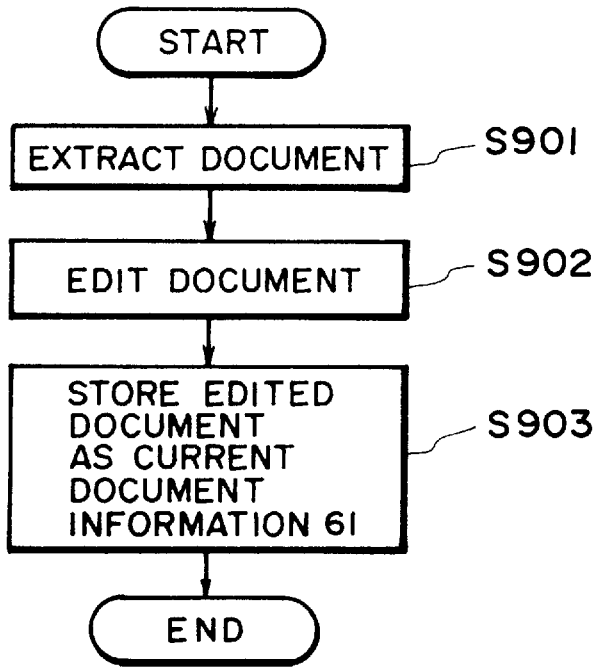
FIG. 9 is a flow chart for document edition and storage.

In case of an operation for document editing, the edited document is stored as the current document information 61 according to the flow chart shown in FIG. 9, as already explained in the conventional example.

Figure 10:
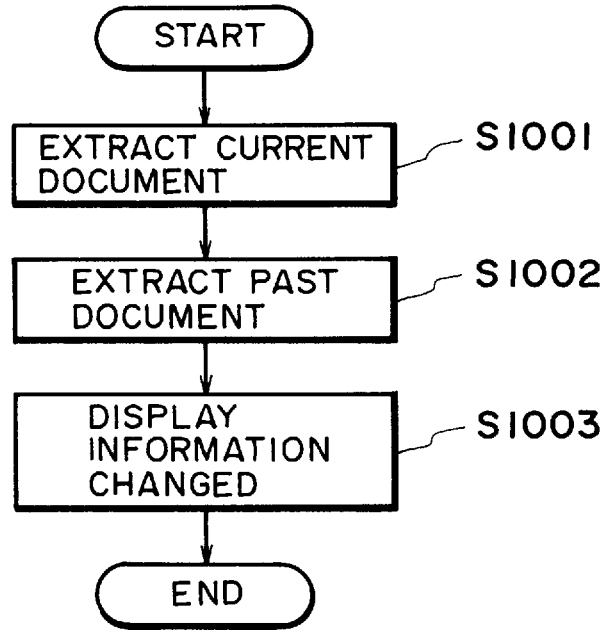
FIG. 10 is a flow chart for display of changed information.
Figure 11:
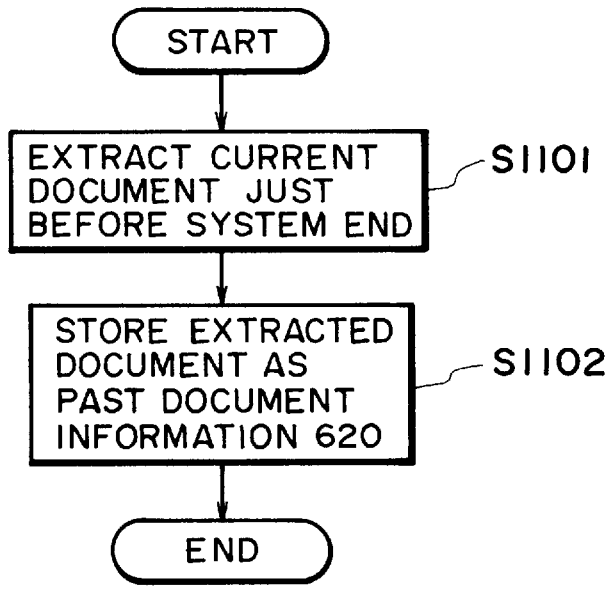
FIG. 11 is a flow chart for termination of reference and storage.

In case of an operation for comparison of the current and past documents, the current document information 61 and the user-classified past document information 621 are extracted from the auxiliary memory device 6 and the change between the two information is displayed according to the flow chart shown in FIG. 10, as already explained in the conventional example.

The extraction of the user-classified past document information 621 from the auxiliary memory device 6 can be achieved in a similar manner as the extraction of a specified document, explained in the conventional example.

When the user effects an operation for ending the function of the system, the sequence proceeds according to a flow chart shown in FIG. 15.

A step S1501 extracts the currently referred document, and a step S1502 stores it as the user-classified past document information 621 in the auxiliary memory device 6.

The storage of the user-classified past document information 621 in the auxiliary memory device 6 can be achieved in a similar manner as the storage of a specified document, explained already in the conventional example.

The flow chart shown in FIG. 15 represents the user-classified document storage program 541.

In this manner the previously referred document information is always stored for each user, and the change of the information for each user can be known by the comparison with the current document information, as already explained in the conventional example.

The storage of the referred structured document as the user-classified past document information 621 of the auxiliary memory device 6 can be conducted no only at the end of the system function but also at each document display or at each start of the editing process.

The present embodiment is realized on event-driven basis, but, as in the conventional example, the processes driven by the respective events may be constructed as independent programs in which the document information is commonly utilized.

In such case, the ending event process becomes a program for varying the version of the document information, and the current document is stored, as a document of a new version, in the user-classified past document information.

In this case, the document display program displays the change between the document information of the previous version and that of the current version.

Such change of version may be conducted at each display or at the start of each editing process.

The conventional example has shown a case of processing a single document, but there can also be processed plural documents, by document specification such as the designation of the document name, for example at the extraction or storage of the document.

In this embodiment the display program and the editing program are separated, but it is also possible to utilize a program in which the display and the editing are united and to dispense with the display program.

The present embodiment enables comprehension of the already known information and the unknown information for each user, by storing the previously referred document or the document of the previous version for each user and clearly indicating the change, in information, from the current document.

Consequently each user can easily see the desired latest information in the form of a document.

[Embodiment 2]

The 1st embodiment involves the possibility that the amount of the stored information becomes enormously large, since the past document information is retained for each user.

The present embodiment increases the count of a counter for a changed document element at each change in the structured document, and retains the counter relating to the reference to the structured document, thereby displaying the change in the information of the structured document between -the-previous reference and the present time, as will be explained in the following.

The system configuration of this embodiment is obtained, from that of the embodiment 1 shown in FIG. 1, by replacing the document display program 510 and the document change program 520 respectively with a document display program 512 and a document change program 522.

Figure 16:
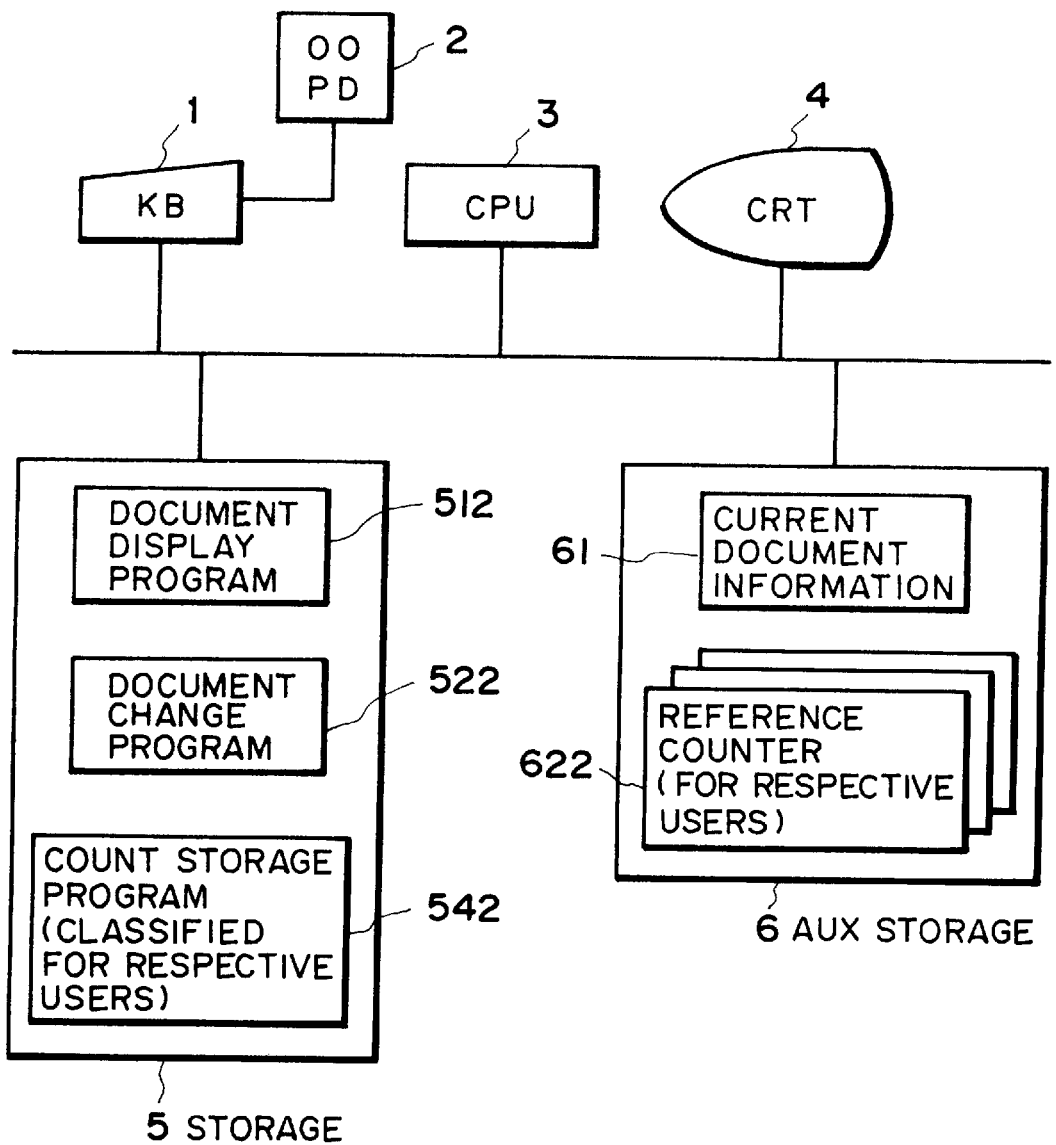
FIG. 16 is a view showing the system configuration of a second embodiment.

Also the user-classified document storage program 541 is replaced by a user-classified counter storage program 542, and, in the auxiliary memory device 6, the user-classified past document information 621 is replaced by a user-classified reference counter 622 (FIG. 16).

In the present embodiment, the document is handled, as shown in FIG. 17, a structured document bearing a counter as a parameter for each structure.

Also the maximum value of the counters is retained for each document.

Figure 18:
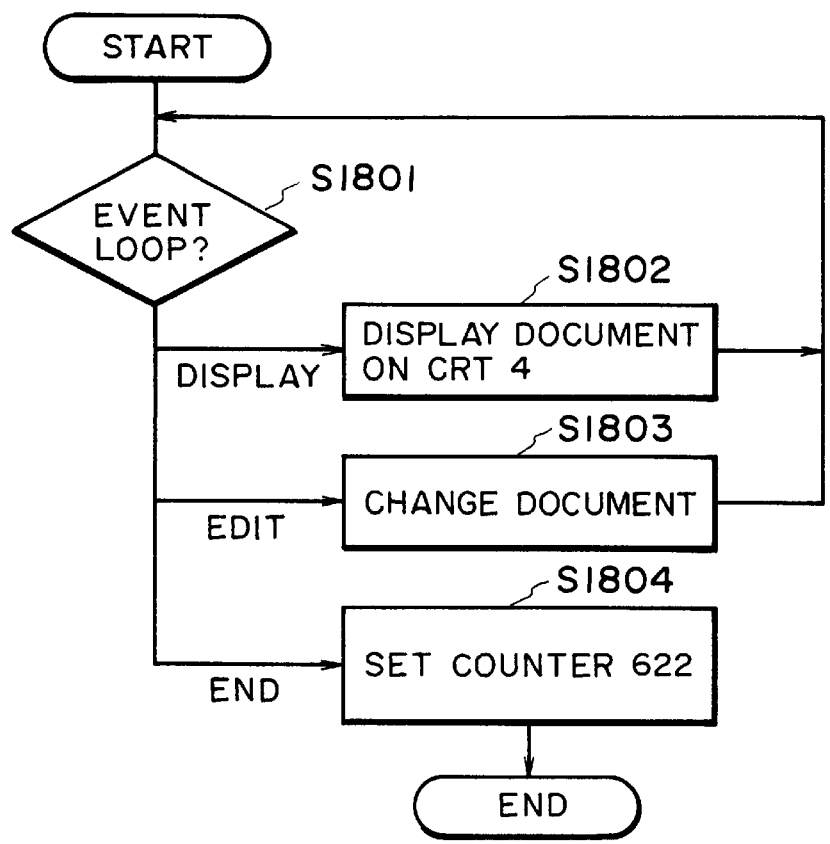
FIG. 18 is a system flow chart of the second embodiment.

The system flow chart of the present embodiment is shown in FIG. 18.

When the system is activated, an event is awaited in an event loop S1801.

In case the user effects an operation for displaying the initial document, namely in case the past document information does not exist, the parameter of each structure is not displayed, so that the document display process is conducted according to the flow chart of the conventional example, shown in FIG. 8.

In case of an event for document change, the editing process is conducted according to a flow chart shown in FIG. 19, as will be explained in the following.

A step S1901 is same as the step S901.

Figure 20:
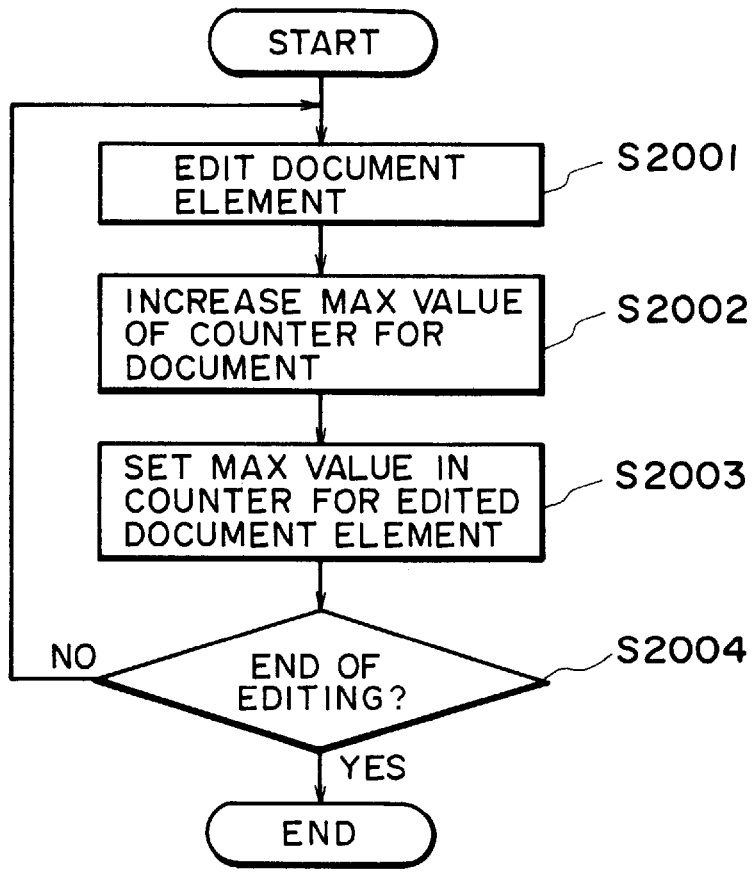
FIG. 20 is a flow chart for document editing.

The document editing process in a step S1902 is conducted according to a flow chart shown in FIG. 20, as will be explained in the following.

In a step S2001, the document information is edited in the unit of a document element.

Upon editing in the unit of a document element, a step S2002 increases the maximum value of the counter associated with the document information, and a step S2003 sets the counter of the changed document element to the maximum value.

The steps S2001, S2002 and S2003 in this document editing process need not necessarily be conducted in succession, but they may be realized for example on event-driven basis as long as the counter associated with the document element and the maximum value counter associated with the document are renewed along with the editing operation on the document element.

After all the required editing operations, a step S2004 terminates the document editing process.

The document after the editing operation is stored, by a step S1903, as the current document information 61.

The storage of said current document information 61 may be conducted at each editing of the document element, in the step S1902.

In case of an event for ending, the function of the system is terminated according to a flow chart shown in FIG. 21, as will be explained in the following.

A step S2101 extracts the currently referred document, and a step S2102 stores the maximum value of the counter of said document in the user-classified reference counter 622 of the auxiliary memory device 6.

In case of an event for display, the document is displayed according to a flow chart shown in FIG. 22, as will be explained in the following.

A step S2201 is same as the step S801 in the conventional example.

A next step S2202 effects display of each structure.

In case a step S2203 discriminates that the value of the counter of said structure is larger than the value in the user-classified reference counter, the sequence proceeds to a step S2204 for causing a display with a changed display parameter, as shown in FIG. 14.

Then the sequence returns to the step S2202 for continuing the process until the end of the document is identified by a step S2205, and, upon said identification, the document display process is terminated.

Figure 19:
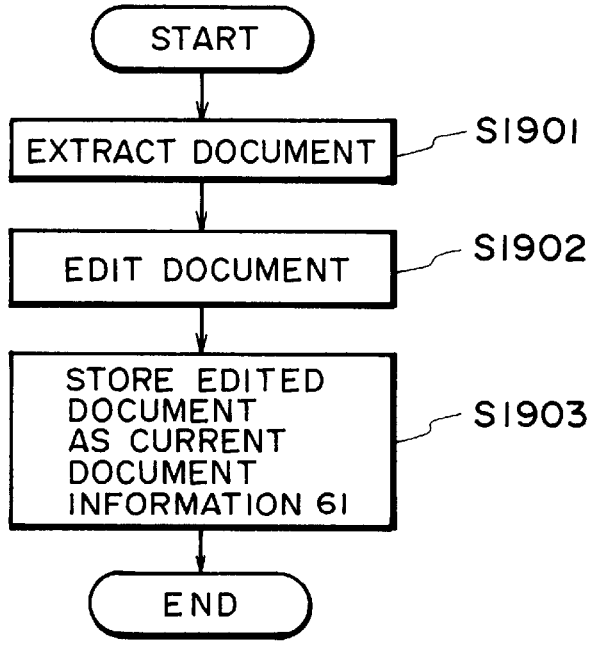
FIG. 19 is a flow chart for document editing and storage.
Figure 21:
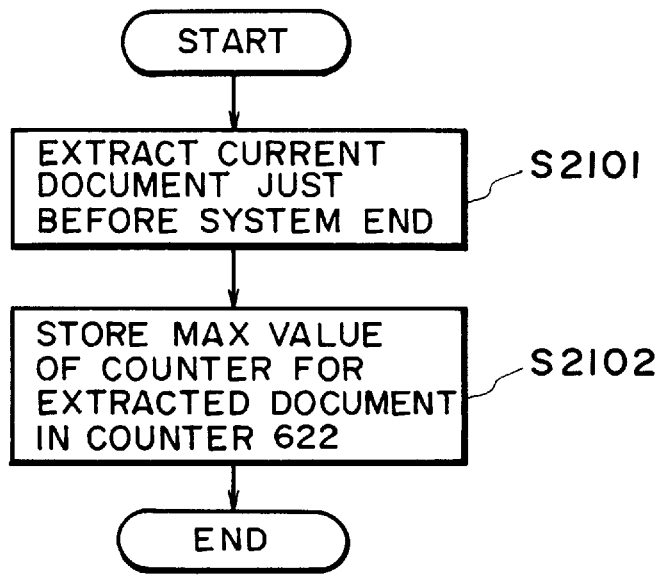
FIG. 21 is a flow chart for end of reference and storage of counter for each user.

The flow charts in FIGS. 22, 19 and 21 respectively represent the document display program 512, the document change program 522 and the user-classified reference counter storage program 542.

In this manner there can be displayed the information changed from the past document.

Such display need not be in the form shown in FIG. 14 but can be in any other form capable of distinguishing the changed information, such as inverted display or colored display.

The storage of the counter of the referred structured document in the user-classified reference counter 622 of the auxiliary memory device 6 is not necessarily limited at the termination of the system function, but can also be conducted, for example, at each document display or at each start of the editing process.

The present embodiment is realized on event-driven basis, but, as in the conventional example, the event-driven processes may be constructed as independent programs in which the document information is commonly utilized.

In such case, the ending event process becomes a program varying the version of the document information, and the count of the counter at present for the current document is stored in the user-classified reference counter, as the information of a new version.

In this case, the document display program displays the information indicating the change between the previous document information and the current document information.

Such change of version may also be conducted at each display or at each start of the editing process.

This embodiment shows a case of processing a single document, but there can also be handled plural documents, by document specification such as the designation of the document name, for example at the extraction or storage of the document.

Also this embodiment employs the display program and the editing program separately, but it is also possible to employ a program in which the display and the editing are united and to dispense with the display program.

In this embodiment, the information changed from the past document can be retained merely by the storage of the counter value for each user and the maximum counter value for each document.

Also the document display program 512 provides a display indicating the change in information from the previous time, except for the initial time, even if the comparison of the past and current document information is not particularly intended, as in the embodiment 1.

Also the present embodiment provides an advantage of reducing the memory capacity, since the data retained as the past information are not the document itself but are very limited to counter values, in contrast to the conventional methods for storing past document, which have to store all the information for each user and therefore require an enormous memory capacity, even with the diff process.

Furthermore, by displaying the difference between the counter value for the changed document element and the counter value for each user, for example in the vicinity of the display example 7 in FIG. 14, each user can further know the number of changes applied to said document elements.

[Embodiment 3]

The 2nd embodiment utilizes a counter as the past document information, but the present invention is not limited to such embodiment. In the present embodiment, at each change in the structured document, the data and time of the change are attached to the changed document element, and also the date and time of the reference of each user to the structured document are retained, whereby the change in information of the structured document between the previous reference and the present can be displayed as explained in the following.

The system configuration of the present embodiment is same as that of the 2nd embodiment shown in FIG. 16, except that the document display program 512 and the document change program 522 are respectively replaced by a document display program 513 and a document change program 523.

Also the user-classified counter storage program 542 is replaced by a user-classified reference time storage program 543, and, in the auxiliary memory device 6, the user-classified reference counter 622 is replaced by a user-classified reference time 623.

In this embodiment, the document is handled, as shown in FIG. 23, as a structured document bearing a renewal time as a parameter for each structure.

The system flow chart of the present embodiment (not shown) is obtained from that of the 2nd embodiment, shown in FIG. 18, by changing the document display process S1802 and the document editing process S1803, and by replacing the user-classified counter storage process S1804 by a user-classified reference time storage process.

When the system is activated, an event is awaited in an event loop.

The initial display of the document is same as in the 2nd embodiment.

In case of an event for editing process, the editing process is conducted according to a flow chart shown in FIG. 24, as will be explained in the following.

A step S2401 is same as the step S901.

Figure 25:
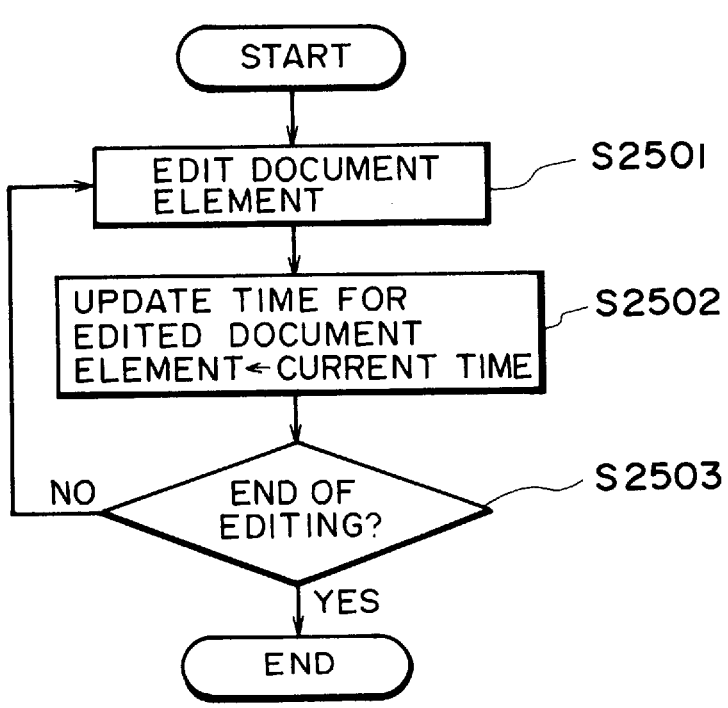
FIG. 25 is a flow chart for document editing.

A document editing process in a step S2402 is conducted according to a flow chart shown in FIG. 25, as will be explained in the following.

A step S2501 edits the document information in the unit of a document element.

After such editing, a step S2502 sets the renewal time parameter of the changed document element is set at the current time.

The steps S2501 and S2502 in said document editing process need not necessarily be conducted in succession, but may be realized for example on an event-driven basis, as long as the renewal time parameter of the document element can be set at the current time along with the editing of the document element.

After all the editing operations, a step S2503 terminates the document editing process.

The edited document is stored, in a step S2403, as the current document information 61.

Said current document information 61 may be stored at each document element editing by the step S2402.

In case of an even for ending, the system function is terminated according to a flow chart shown in FIG. 26, as will be explained in the following.

A step S2601 stores the current time in the user-classified reference time 623 in the auxiliary memory device 6.

In case of an event for display, the document is displayed according to a flow chart shown in FIG. 27, as will be explained in the following.

A step S2701 is same as the step S801 in the conventional example.

Then a step S2702 effects display of each structure.

If a step S2703 discriminates that the renewal time, attached as the parameter to said structure, is later than the previous system ending time retained as the user-classified reference time, a step S2704 provides a display, with a varied feature, as shown by the display example 7 in FIG. 14.

Then the sequence returns to the step S2702 to continue the process until the end of the document is identified by a step S2705. Upon said identification, the document display process is terminated.

Figure 24:
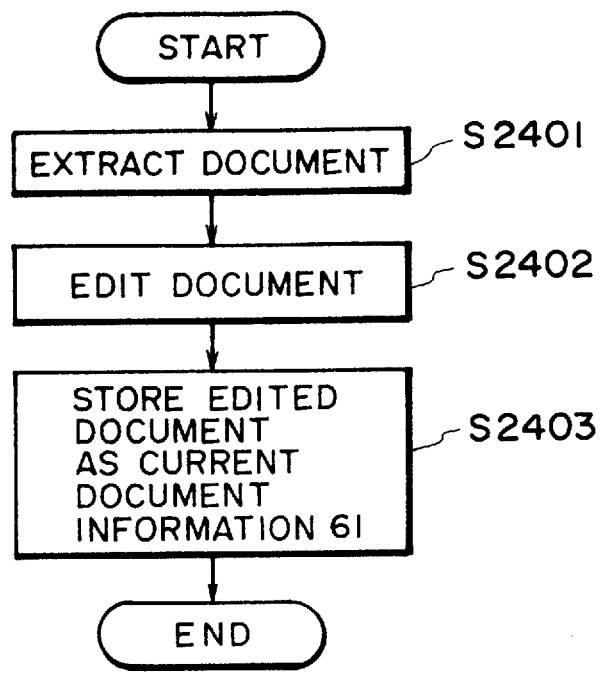
FIG. 24 is a flow chart for document editing and storage.
Figure 26:
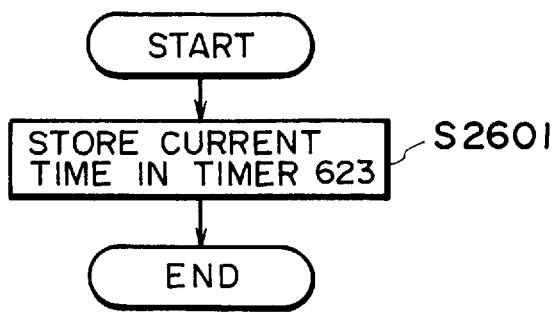
FIG. 26 is a flow chart for end of reference and storage of reference time for each user.
Figure 27:
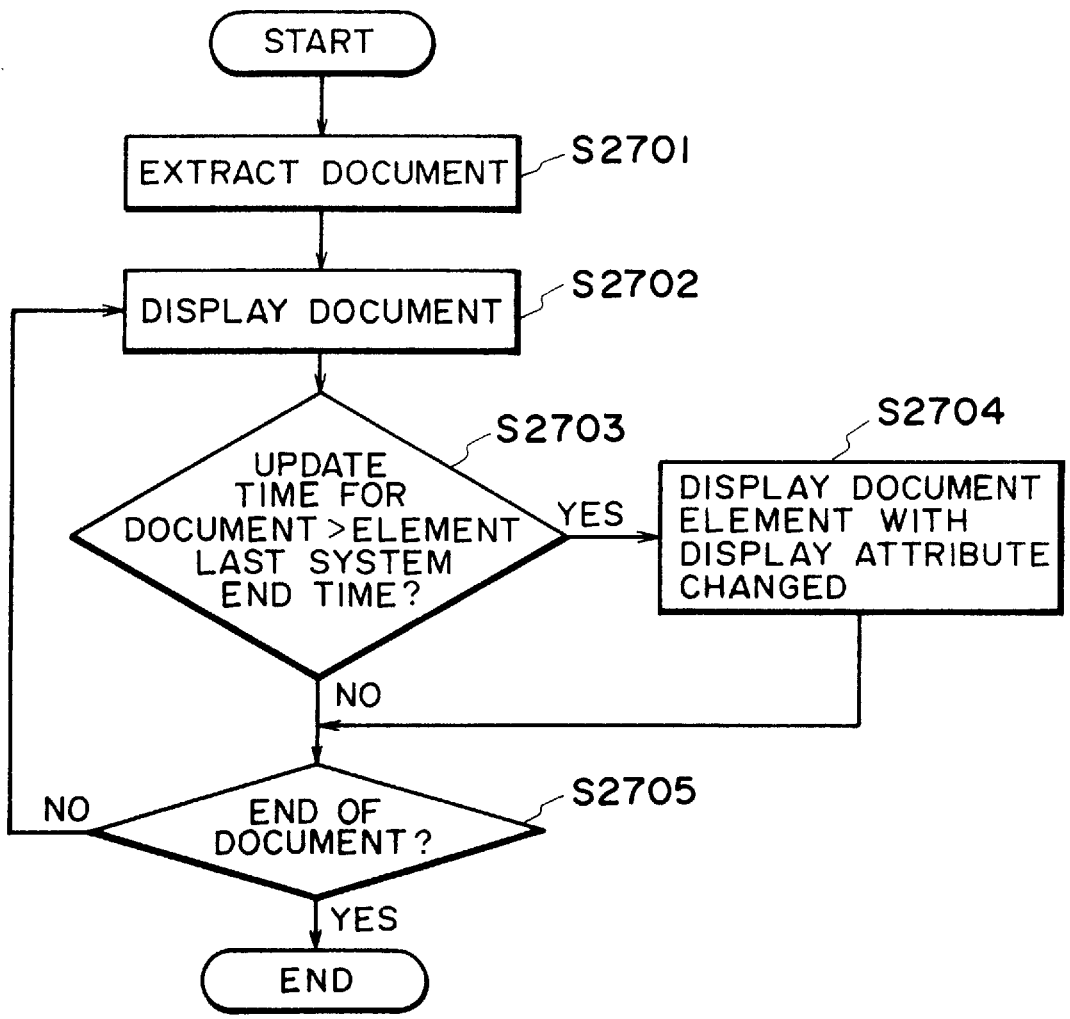
FIG. 27 is a flow chart for display of changed information.

The flow charts shown in FIGS. 27, 24 and 26 respectively represent the document display program 513, the document change program 523 and the user-classified reference time storage program 543.

In this manner there can be displayed the information changed from the past document.

The method of display can be same as that in the 2nd embodiment.

The storage of the reference time, for each user, in the user-classified reference time 623 of the auxiliary memory device 6 is not limited to the end of the system function, but can also be conducted at each document display or at the start of each editing process.

The present embodiment is realized on event-driven basis, but, as in the conventional example, the event-driven processes can also be constructed as independent programs in which the document information is commonly utilized.

In this case, the ending event process becomes a program for changing the version of the document information, and the current time is stored, as the information of a new version, in the user-classified reference time.

Also in this case, the document display program displays the information indicating the change between the document information of the previous version and the current document information.

Such version change may be conducted at each display or at the start of each editing process.

Also this embodiment has been explained by a case of handling only one document, but there can be handled plural documents also by document specification such as the designation of the document name, for example at the extraction or storage of the document.

Also in this embodiment, the display program and the editing program are separated, but it is also possible to employ an editing program in which the display and the editing are united and to dispense with the display program.

In this embodiment, the information indicating the change from the past document can be retained merely by the storage of the reference end time for each user.

Also the use of the time information which an absolute value, instead of the counter value, provides an advantage of eliminating the need to extract the current document information at the storage of the past document information or the document information of a new version.

[Embodiment 4]

The 3rd embodiment employs the time as the past document information, but the present invention is not limited to such embodiment.

In the present embodiment, at each change in the structured document, a comment, such as the reason for change, is attached to the changed document element, and such comments are retained as a table for each document.

At the end of reference to the document by each user, there is retained the last comment of said table for the document, whereby displayed is the change in the information between the previous reference and the present, as will be explained in the following.

The system configuration of the present embodiment is same as that of the 2nd embodiment shown in FIG. 16, except that the document display program 512 and the document change program 522 are respectively replaced by a document display program 514 and a document change program 524.

Also the user-classified counter storage program 542 is replaced by a user-classified comment storage program 544, and, in the auxiliary memory device 6, the user-classified reference counter 622 is replaced by a user-classified reference comment 624, as shown in FIG. 28.

In this embodiment, the document is processed, as shown in FIG. 29, as a structured document, bearing a comment, such as the reason for change, as a parameter for each structure.

The system flow chart of this embodiment (not shown) is obtained from that of the 2nd embodiment shown in FIG. 18, by varying the document display process S1802 and the document editing process S1803 and replacing the user-classified counter storage process S1804 by a user-classified comment storage process.

When the system is activated, an event is awaited in an event loop.

The initial display of the document is conducted in the same manner as in the 2nd and 3rd embodiments.

In case of an event for editing, the editing process is conducted according to a flow chart shown in FIG. 30, as will be explained in the following.

A step S3001 is same as the step S901.

Figure 31:
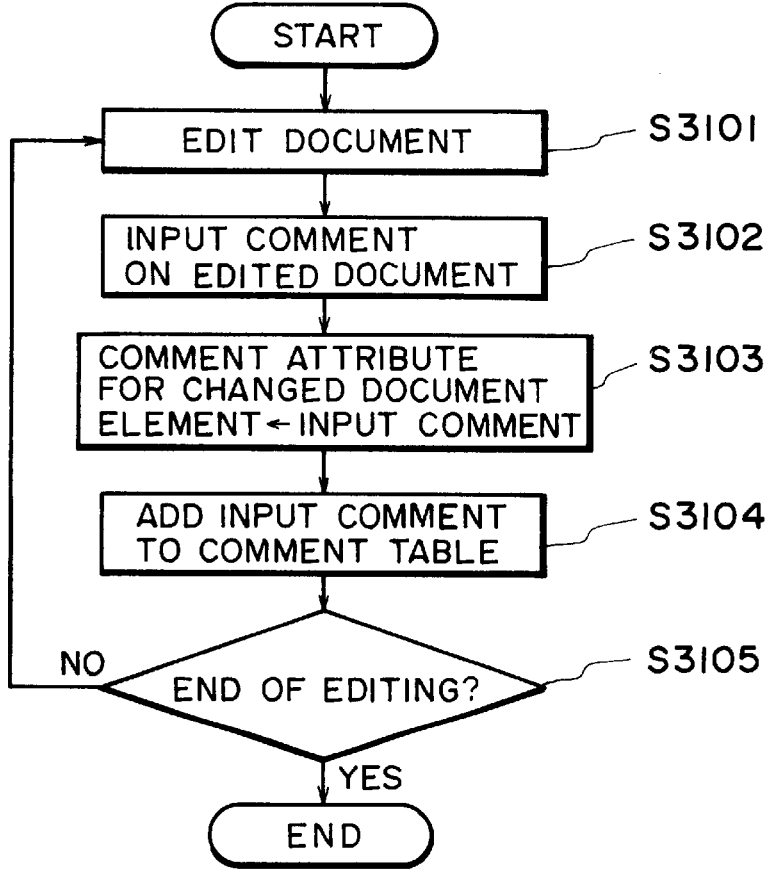
FIG. 31 is a flow chart for document editing.

The document editing process in a step S3002 is conducted according to a flow chart shown in FIG. 31, as will be explained in the following.

A step S3101 edits the document in the unit of a document element.

After the editing operation for a document element, a step S3102 enters a comment to the changed document, and a step S3103 sets the comment parameter of the changed structure at the entered comment.

Figure 32:
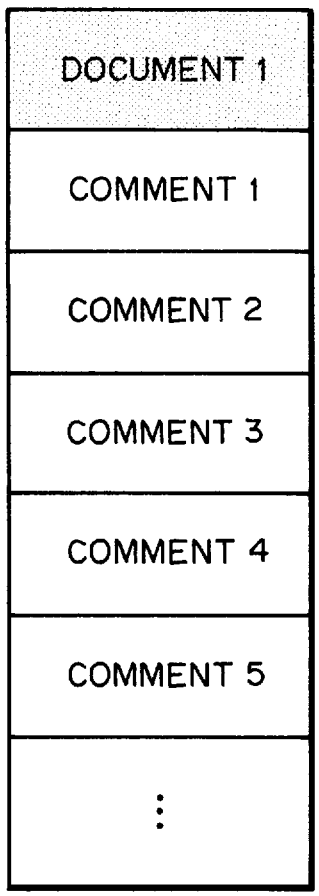
FIG. 32 is a view showing an example of a comment table.

Also the entered comment is added, in a step S3104, to a table as shown in FIG. 32, associated with each document.

These steps S3101, S3102, S3103 and S3104 in this document editing need not necessarily be conducted in succession, but may also be realized for example on event-driven basis, as long as the comment attached to the document element and the comment table associated with the document are renewed along with the editing operation of the document element.

The edited document is stored, in a step S3003, as the current document information 61.

The storage of the current document information may also be conducted at each editing of the document element in the step S3002.

In case of an event for ending, the system function is terminated according to a flow chart shown in FIG. 33, as will be explained in the following.

A step S3301 extracts the currently referred document, and a step S3302 stores the latest comment, retained by said document at that point, as the user-classified reference comment 624 in the auxiliary memory device 6.

In case of an event for display, the document is displayed according to a flow chart shown in FIG. 34, as will be explained in the following.

A step S3401 is same as the step S801 in the conventional example.

A next step S3402 executes display of each structure.

If a step S3403 identifies that the comment associated with said structure is later than the comment retained as the user-classified reference comment, a step S3404 provides a display with a modified display feature, as shown by the example 7 in FIG. 14.

Then the sequence returns to the step S3402 for continuing the processing, until the end of the document is confirmed by a step S3405. Upon said confirmation, the document display process is terminated.

Figure 30:
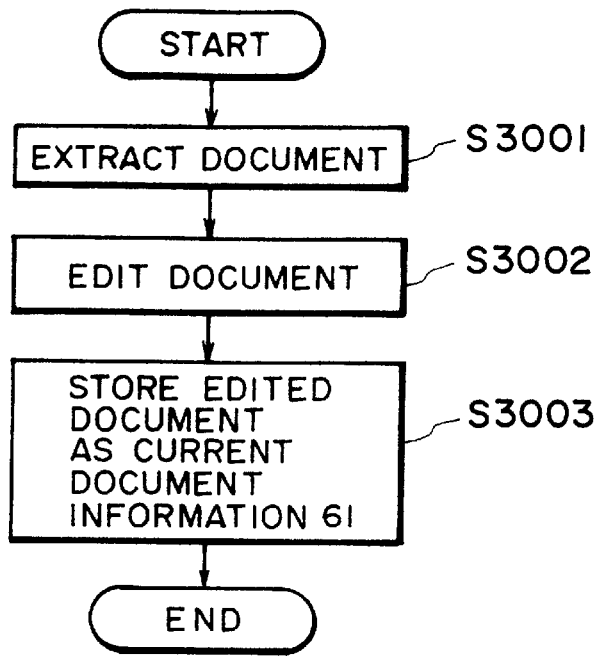
FIG. 30 is a flow chart for document editing and storage.
Figure 33:
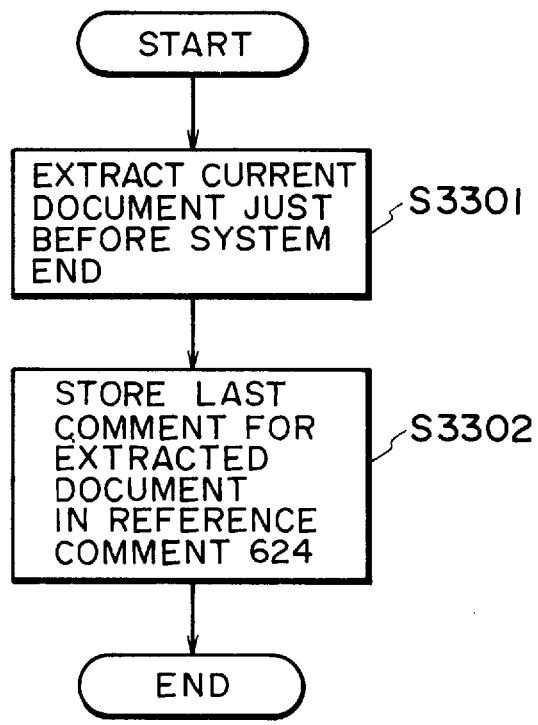
FIG. 33 is a flow chart for end of reference and storage of comments for each user.

The flow charts in FIGS. 34, 30 and 33 respectively represent the document display program 514, the document change program 524 and the user-classified reference comment storage program 544.

In this manner there can be displayed the change from the past document.

The method of display can be same as that in the 2nd and 3rd embodiments.

The storage of the latest comment of the referred structured document as the user-classified reference comment 624 in the auxiliary memory device 6 can .be conducted not necessarily at the end of the system function, but also at each document display or at the start of each editing process.

It is also possible to attach numbers to the comment tables and to use said numbers as the user-classified reference comments.

The present embodiment is realized on event-driven basis, but it is also possible to construct the event-driven processes as independent programs in which the document information is commonly utilized.

In such case, the ending event process becomes a program for changing the version of the document information, and the latest comment on the current document at present is stored, as the information of a new version, in the user-classified reference comment.

In such case, the document display program displays the information indicating the change between the document information of the previous version and the current document information.

Said version change may be conducted at each display or at the start of each editing process.

This embodiment has shown a case of processing a single document, but there can also be handled plural documents by document specification such as the designation of the document name, at the extraction or storage of the document.

Also in this embodiment the display program and the editing program are separated, but it is also possible to utilize an editing program in which the display and the editing are united, and to dispense with the display program.

In this embodiment, the information indicating the change from the past document can be retained merely by the storage of the last reference comment for each user and the comment table for each document.

This embodiment also provides an advantage, by the comments attached to each document, of retaining the history of changes of the document for the unit of each structure.

The present invention is applicable either to a system composed of plural equipment or an apparatus consisting of a single equipment. It is naturally applicable also to a case in which the present invention is realized by the supply of a program to a system or an apparatus.

The present invention enables comprehension of the information already known to the user and that still unknown thereto, by clearing displaying the position of change in information between the document referred previously and the current document.

Consequently each user can easily obtained the latest information, desired by the user, in the form of a document.

Also the present invention provides an advantage of reducing the memory capacity, because the data retained as the past information are not the document itself but very limited information such as counter values or times, in contrast to the conventional methods for storing the past document, such as diff, which have to store all the information for each user and may therefore require an enormous memory capacity.

Also there is provided an advantage that the change of the information is clearly indicated, even if the comparison of the past and current document information is not particularly intended.

What is claimed is:

1. A document processing apparatus provided with document information utilizable by plural operators, comprising:
   editing means for editing the document information;
   first memory means for storing the document information edited by said editing means and change time information as to a time when the document information is changed;
   second memory means for storing, for each operator, access time information as to a time when the document information is last referred to or edited by the operator;
   detection means for comparing the change time information stored in said first memory means with the access time information stored in said second memory means and detecting a portion of the document information changed after the access time in response to a comparison result; and
   display control means for controlling a display device to display the portion of the document information detected by said detection means distinguishably from other portions.

2. An apparatus according to claim 1, further comprising increment means for incrementing the change time information stored in the first memory means, at each editing of the document information.

3. An apparatus according to claim 2, wherein the document information comprises a structured document.

4. An apparatus according to claim 3, wherein said detection means compares the document information in structural units.

5. An apparatus according to claim 3, wherein the structured document is divided into segments and the change time information is associated with the document segment by segment and wherein said first memory means stores the change time information for one or more of segments edited by said editing means in correspondence to the one or more segments and said detection means performs the comparison and the detection segment by segment.

6. An apparatus according to claim 1, wherein the change time information and the access time information are generated using a time stamp.

7. An apparatus according to claim 6, further comprising renewal means for renewing the change time information stored in said first memory means, at each editing of the document information.

8. An apparatus according to claim 7, wherein the document information comprises a structured document.

9. An apparatus according to claim 8, wherein said detection means compares the document information in structural units.

10. An apparatus according to claim 1, wherein the change time information and the access time information are generated using a change command identifier.

11. An apparatus according to claim 1, wherein the change time information and the access time information are generated using a counter value.

12. A document processing method, comprising:
    an editing step for editing document information;
    a first memory step for storing the edited document information and change time information as to a time when the document information is changed;
    a second memory step for storing, for each operator, access time information as to a time when said document information is last referred to or edited by the operator;
    a detection step for comparing the change time information stored in said first memory step with the access time information stored in said second memory step and detecting a portion of the document information changed after the access time in response to a comparison result; and
    a display control step for controlling a display device to display the portion of the document information detected by said detection step distinguishably from other portions.

13. A method according to claim 12, further comprising an incrementing step of incrementing the change time information stored in the first memory step, at each editing of the document information.

14. A method according to claim 13, wherein the document information comprises a structure document.

15. A method according to claim 14, wherein said detection step compares the document information in structural units.

16. A method according to claim 12, further comprising a renewal step of renewing the change time information stored in said first memory step, at each editing of the document information.

17. A method according to claim 16, wherein the document information comprises a structured document.

18. A method according to claim 17, wherein said detection step compares the document information in structural units.

19. A method according to claim 17, wherein the structured document is divided into segments and the change time information is associated with the document segment by segment and wherein said first memory step stores the change time information for one or more of segments edited by said editing step in correspondence to the one or more segments and said detection step performs the comparison and the detection segment by segment.

20. A method according to claim 12, wherein the change time information and the access time information are generated using a time stamp.

21. A method according to claim 12, wherein the change time information and the access time information are generated using a change command identifier.

22. A method according to claim 12, wherein the change time information and the access time information are generated using a counter value.

23. A computer usable medium having computer readable program code means for causing a computer to process a document, the medium comprising:

an editing means for editing document information;

a first memory means for storing the edited document information and change time information as to a time when the document information is changed;

a second memory means for storing, for each operator, access time information as to a time when said document information is last referred to or edited by the operator;

a detection step for comparing the change time information stored in said first memory means with the access time information stored in said second memory means and detecting a portion of the document information changed after the access time in response to a comparison result; and a display control means for controlling a display device to display the portion of the document information detected by said detection means distinguishably from other portions.

24. A memory medium according to claim 23, further comprising increment means for incrementing the change time information stored in the first memory means, at each editing of the document information.

25. A memory medium according to claim 24, wherein the document information comprises a structured document.

26. A memory medium according to claim 25, wherein said detection means compares the document information in structural units.

27. A memory medium according to claim 23, further comprising renewal means for renewing the change time information stored in said first memory means, at each editing of the document information.

28. A memory medium according to claim 27, wherein the document information comprises a structured document.

29. A memory medium according to claim 28, wherein said detection means compares the document information in structural units.

30. A memory medium according to claim 28, wherein the structured document is divided into segments and the change time information is associated with the document segment by segment and wherein said first memory means stores the change time information for one or more of segments edited by said editing means in correspondence to the one or more segments and said detection means performs the comparison and the detection segment by segment.

31. A memory medium according to claim 23, wherein the change time information and the access time information are generated using a time stamp.

32. A memory medium according to claim 23, wherein the change time information and the access time information are generated using a change command identifier.

33. A memory medium according to claim 23, wherein the change time information and the access time information are generated using a counter value.

* * * * *

UNITED STATES PATENT AND TRADEMARK OFFICE
CERTIFICATE OF CORRECTION

PATENT NO. : 5,819,300

DATED : October 6, 1998

INVENTOR(S) : AKIHIRO KOHNO ET AL.

It is certified that error appears in the above-identified patent and that said Letters Patent is hereby corrected as shown below:

COLUMN 2
   line 9,   "explained are" should read --are explained--;
   line 21,  "explained are" should read --are explained--;
   line 27,  "61." should read --6.--; and
   line 35,  "two extracted document information" should read --information extracted from two documents--.

COLUMN 3
   line 2,   "is" should read --are--;
   line 53,  "clearing" should read --clearly--;
   line 60,  "in storing" should read --for storing a--; and
   line 63,  "diff" should read --diff for--.

COLUMN 4
   line 48,  "edition" should read --editing--.

UNITED STATES PATENT AND TRADEMARK OFFICE
CERTIFICATE OF CORRECTION

PATENT NO. : 5,819,300

DATED : October 6, 1998

INVENTOR(S) : AKIHIRO KOHNO ET AL.          Page 2 of 3

It is certified that error appears in the above-identified patent and that said Letters Patent is hereby corrected as shown below:

COLUMN 5
  line 54, "same" should read --the same--.

COLUMN 6
  line 5, "two" should read --two groups of--; and
  line 32, "no" should read --not--.

COLUMN 7
  line 11, "-the-previous-" should read --the previous--; and
  line 24, "a structured" should read --as a structured--.

COLUMN 9
  line 12, "document" should read --documents--;
  line 26, "data" should read --date--; and
  line 34, "same" should read --the same--.

UNITED STATES PATENT AND TRADEMARK OFFICE
CERTIFICATE OF CORRECTION

PATENT NO. : 5,819,300

DATED : October 6, 1998

INVENTOR(S) : AKIHIRO KOHNO ET AL.

It is certified that error appears in the above-identified patent and that said Letters Patent is hereby corrected as shown below:

COLUMN 10
  line 2, "is set" should be deleted; and
  line 16, "even" should read --event--.

COLUMN 11
  line 11, "which" should read --as--.

COLUMN 12
  line 50, ".be" should read --be--.

COLUMN 13
  line 30, "clearing" should read --clearly--.

Signed and Sealed this

Thirty-first Day of October, 2000

*Attest:*

Q. TODD DICKINSON

*Attesting Officer*     *Director of Patents and Trademarks*